(12) United States Patent
Dogin et al.

(10) Patent No.: US 10,692,082 B2
(45) Date of Patent: Jun. 23, 2020

(54) METHOD AND SYSTEM FOR FACILITATING THIRD PARTY RECEIPT OF GOODS AND/OR SERVICES

(75) Inventors: Jennifer Dogin, Mamaroneck, NY (US); Brian Maw, Norwalk, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 261 days.

(21) Appl. No.: 13/571,926

(22) Filed: Aug. 10, 2012

(65) Prior Publication Data

US 2014/0046846 A1 Feb. 13, 2014

(51) Int. Cl.
*G06Q 20/40* (2012.01)
*G06Q 20/12* (2012.01)
*G06Q 20/02* (2012.01)
*G06Q 30/06* (2012.01)

(52) U.S. Cl.
CPC ........ *G06Q 20/401* (2013.01); *G06Q 20/02* (2013.01); *G06Q 20/12* (2013.01); *G06Q 30/06* (2013.01)

(58) Field of Classification Search
CPC .......................... G06Q 20/40; G06Q 20/405
USPC .......................................................... 705/44
See application file for complete search history.

(56) References Cited

U.S. PATENT DOCUMENTS

| 8,370,210 B2 | 2/2013 | Grunski et al. | |
| 2003/0101135 A1* | 5/2003 | Myatt et al. | 705/40 |
| 2007/0083400 A1 | 4/2007 | Katz | |
| 2008/0071587 A1 | 3/2008 | Granucci et al. | |
| 2009/0327151 A1 | 12/2009 | Carlson et al. | |
| 2011/0191196 A1 | 8/2011 | Orr et al. | |
| 2011/0225063 A1 | 9/2011 | Grunski et al. | |

(Continued)

OTHER PUBLICATIONS

Final Office Action dated Jul. 11, 2014, in copending U.S. Appl. No. 13/571,401. (13 pages).

(Continued)

*Primary Examiner* — Bennett M Sigmond
*Assistant Examiner* — Michael D Cranford
(74) *Attorney, Agent, or Firm* — Buchanan Ingersoll & Rooney PC

(57) ABSTRACT

A method for processing a reservation includes: receiving reservation information, the information including a preauthorization amount, payment information, merchant identifier, and predetermined period of time; storing the information; identifying a unique identifier associated with the information; transmitting the unique identifier and predetermined period of time to a merchant associated with the merchant identifier; receiving data identifying, within the predetermined period of time, fulfillment of the reservation; and transmitting the information for payment of a transaction using the payment information. A method for processing a transaction includes: receiving preauthorization information for a transaction to be processed, the information including a preauthorization amount, payment information, and predetermined period of time; storing the information; identifying a unique identifier associated with the information; receiving, within the predetermined period of time, an authorization request for a transaction, the request including the unique identifier and a transaction amount; and processing the transaction using the payment information.

36 Claims, 10 Drawing Sheets

(56) References Cited

U.S. PATENT DOCUMENTS

| | | |
|---|---|---|
| 2011/0258076 A1 | 10/2011 | Muirbrook |
| 2012/0016696 A1 | 1/2012 | Lee |
| 2012/0016794 A1 | 1/2012 | Orr et al. |
| 2012/0066133 A1* | 3/2012 | Bernstein et al. ............ 705/44 |
| 2013/0046595 A1 | 2/2013 | Wu et al. |

OTHER PUBLICATIONS

Final Office Action issued by the U.S. Patent and Trademark Office in the U.S. Appl. No. 13/571,401, dated Feb. 23, 2015, U.S. Patent and Trademark Office, Alexandria, VA.

Office Action issued by the U.S. Patent and Trademark Office in the U.S. Appl. No. 13/571,401, dated Oct. 24, 2014, U.S. Patent and Trademark Office, Alexandria, VA.

* cited by examiner

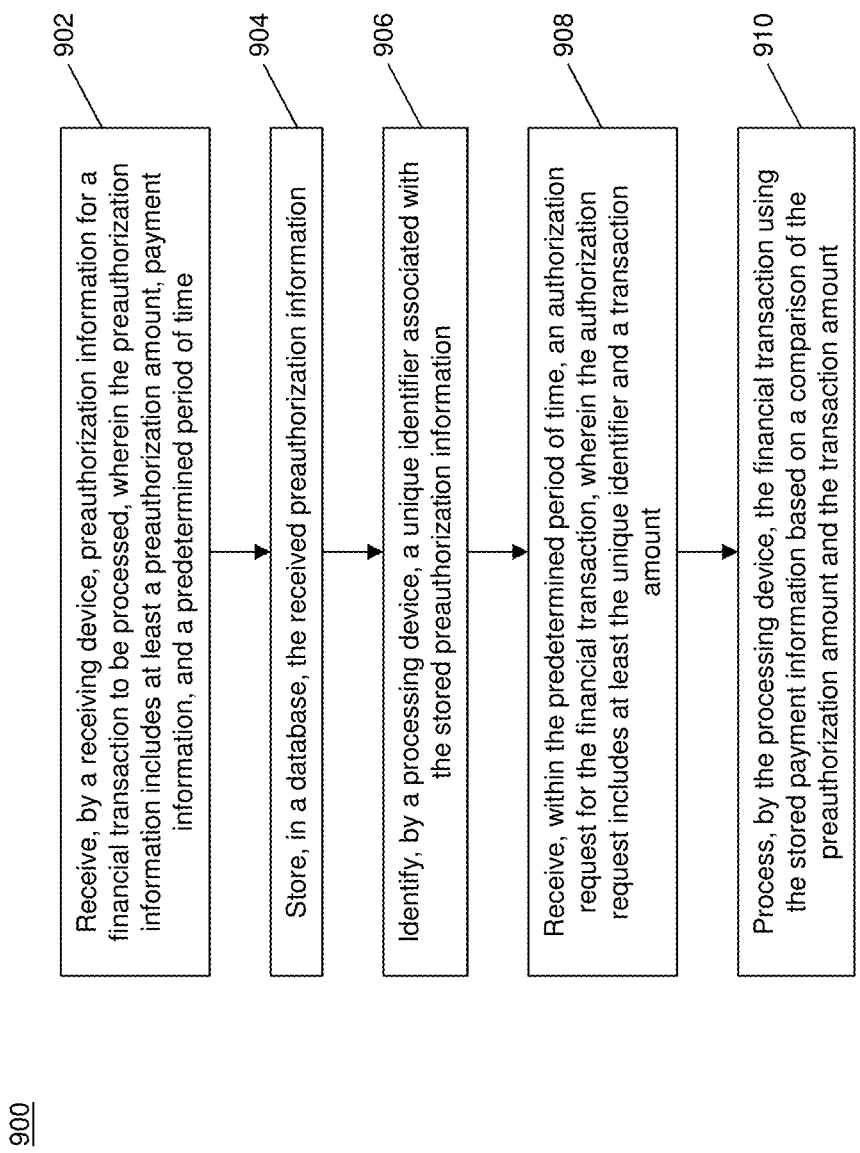

METHOD AND SYSTEM FOR FACILITATING THIRD PARTY RECEIPT OF GOODS AND/OR SERVICES

FIELD

The present disclosure relates to facilitating third party receipt of goods and/or services, specifically the reservation of a future financial transaction including providing payment information by a party for the benefit of a third party.

BACKGROUND

Consumers give gifts to other consumers on any number of occasions, such as birthdays, holidays, anniversaries, graduations, and other special occasions. In many instances, it has become common for consumers to gift others with gift cards or gift certificates to merchants as a substitute for a specific gift. Gift cards provide a number of benefits to consumers: they allow the receiver to pick the precise item they want, they can be used at the receiver's leisure, and they are easy to convey, especially in instances where a gift would otherwise need to be shipped.

However, there are also problems with gift cards. Gift cards and gift certificates are generally for a set value to be redeemed at the merchant. The result is that in some transactions, the consumer using the gift card may either be forced to use their own funds to pay for what the card does not cover, or they may use the card and then retain it with a small amount left unspent. Cards with little value left can accumulate and in some instances may be lead to being discarded by the consumer. The result is that the receiver may pay to use their gift card, or the giver may pay for value that is never used. Also, there is a difference in perception between "let me treat you to a dinner out" as opposed to "here is a gift card for $XX at this restaurant."

Thus, there is a perceived opportunity for a technical improvement to methods and systems for the giving and redemption of gifts in order to facilitate the receipt of goods or services by a third party by allowing for a gift to cover a specific transaction amount that is unknown at the time of the gift.

SUMMARY

The present disclosure provides a description of a systems and methods for facilitating receipt of goods and/or services by a third party.

A method for processing a reservation includes: receiving, by a receiving device, reservation information for a reservation, wherein the reservation information includes at least a preauthorization amount, payment information, a merchant identifier, and a predetermined period of time; storing, in a database, the received reservation information; identifying, by a processing device, a unique identifier associated with the stored reservation information; transmitting, by a transmitting device, at least the unique identifier and predetermined period of time to a merchant associated with the merchant identifier; receiving data identifying, within the predetermined period of time, fulfillment of the reservation; and transmitting, by the transmitting device, the stored payment information for payment of a financial transaction based on the preauthorization amount.

A method for processing a financial transaction includes: receiving, by a receiving device, preauthorization information for a financial transaction to be processed, wherein the preauthorization information includes at least a preauthorization amount, payment information, and a predetermined period of time; storing, in a database, the received preauthorization information; identifying, by a processing device, a unique identifier associated with the stored preauthorization information; receiving, within the predetermined period of time, an authorization request for a financial transaction, wherein the authorization request includes at least the unique identifier and a transaction amount; and processing, by the processing device, the financial transaction using the stored payment information based on a comparison of the preauthorization amount and the transaction amount.

BRIEF DESCRIPTION OF THE DRAWING FIGURES

Exemplary embodiments are best understood from the following detailed description when read in conjunction with the accompanying drawings. Included in the drawings are the following figures:

FIG. 9 is a flow chart illustrating a method for processing a preauthorized transaction initiated by a third party in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Facilitating Third Party Receipt of Goods and/or Services

Figure 1:
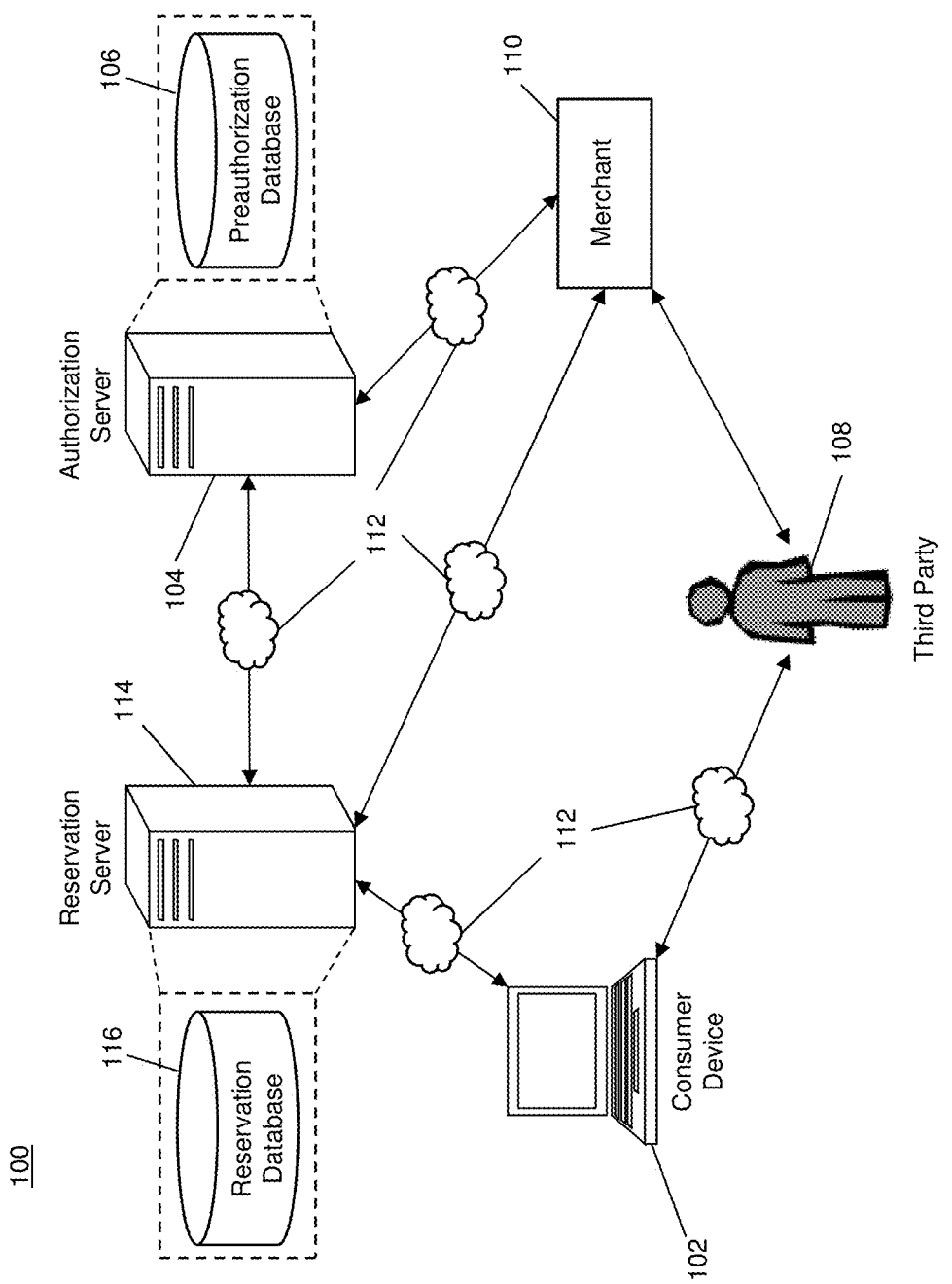
FIG. 1 is a block diagram illustrating a system for facilitating the receipt of goods and/or services by a third party in accordance with exemplary embodiments.

FIG. 1 illustrates a system 100 for facilitating a financial transaction. The system 100 may include a consumer device 102, an authorization server 104, a reservation server 114, a merchant 110, and a third party 108. Each of the components may be configured to communicate via a network 112. The network 112 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof.

It may be a dedicated financial transaction network, a public or private network, or combinations thereof. Other suitable network types and configurations will be apparent to persons having skill in the relevant art.

The consumer device 102 may be configured to make a reservation with the reservation server 114 or authorization server 104. The reservation may be a preauthorization for a financial transaction that includes the third party 108. The consumer device 102 may make the reservation by submitting reservation information to the reservation server 114. The reservation information may include a preauthorization amount, payment information, a merchant identifier, and a predetermined period of time, discussed in more detail below. In some embodiments, the reservation information may include third party information (e.g., identifying the third party 108 that will receive the goods and/or services). It will be apparent to persons having skill in the relevant art that the consumer device 102 may be any device suitable for performing the functions as disclosed herein, such as a desktop computer, a notebook computer, a laptop computer, a tablet computer, a cellular phone, a smart phone, etc. In some embodiments, a consumer may make the reservation directly (e.g., by communicating with the reservation server 114 or a user of the reservation server 114 via e-mail, phone, etc.).

The reservation server 114 may receive the reservation information and store the information in a reservation database 116. The reservation server 114 may then notify the merchant 110 (e.g., associated with the stored merchant identifier) of the reservation. In some embodiments, the reservation server 114 may transmit preauthorization information to the authorization server 104, which may store the preauthorization information in a preauthorization database 106. In one embodiment, the reservation server 114 and the authorization server 104 may be a single server.

Data stored in the reservation database 116 or the preauthorization database 106 (the "databases") may be stored on any type of suitable computer readable media, such as optical storage (e.g., a compact disc, digital versatile disc, blu-ray disc, etc.) or magnetic tape storage (e.g., a hard disk drive). The databases may be configured in any type of suitable database configuration, such as a relational database, a structured query language (SQL) database, a distributed database, an object database, etc. Suitable configurations and database storage types will be apparent to persons having skill in the relevant art. The databases may each be a single database, or may comprise multiple databases which may be interfaced together (e.g., physically or via a network, such as the network 112).

In one embodiment, the reservation server 114 may identify and transmit a unique identifier associated with the reservation to the consumer device 102. The consumer may then provide the unique identifier to the third party 108. In one, the reservation server 114 may transmit the unique identifier directly to the third party 108 and notify the third party 108 of the gifted preauthorized transaction. The third party 108 may visit a location of the merchant 110, such as a physical location or a website hosted by or on behalf of the merchant 110. The third party 108 may confirm the preauthorized transaction with the merchant 110, such as by providing the unique identifier to the merchant 110 or providing authentication as will be discussed in more detail below.

The merchant 110 may notify the reservation server 114 of the third party fulfillment of the reservation. The merchant 110 may also initiate a financial transaction with the third party 108 for goods and/or services. In one embodiment, the reservation server 114 may transmit the stored payment information, previously provided by the consumer device 102, to the merchant 110 for payment of the financial transaction. The merchant 110 may then submit an authorization request for the financial transaction to the authorization server 104 for processing. In another embodiment, the merchant 110 may submit an authorization request to the authorization server 104, who may then communicate with the reservation 114 to obtain the payment information for the transaction (e.g., based on the associated unique identifier, etc.).

The authorization server 104 may process the financial transaction using methods that will be apparent to persons having skill in the relevant art, such as the traditional four party transaction processing system. In some embodiments, the authorization server 104 (e.g., or the reservation server 116 prior to providing the merchant 110 or authorization server 104 with the payment information) may contact the consumer device 102 to obtain approval of the transaction amount. In one embodiment, the consumer device 102 may be contacted for approval of the transaction amount if the transaction amount exceeds the preauthorized amount.

Once the transaction has been processed, the authorization server 104 may transmit an authorization response (e.g., approving or denying, or splitting (approving part equal to a preauthorization amount, and denying the rest) the transaction) to the merchant 110, who may then finalize the transaction with the third party 108. The authorization server 104 may also transmit a receipt of the transaction to the consumer device 102 directly or via the reservation server 114.

Reservation Server

Figure 2:
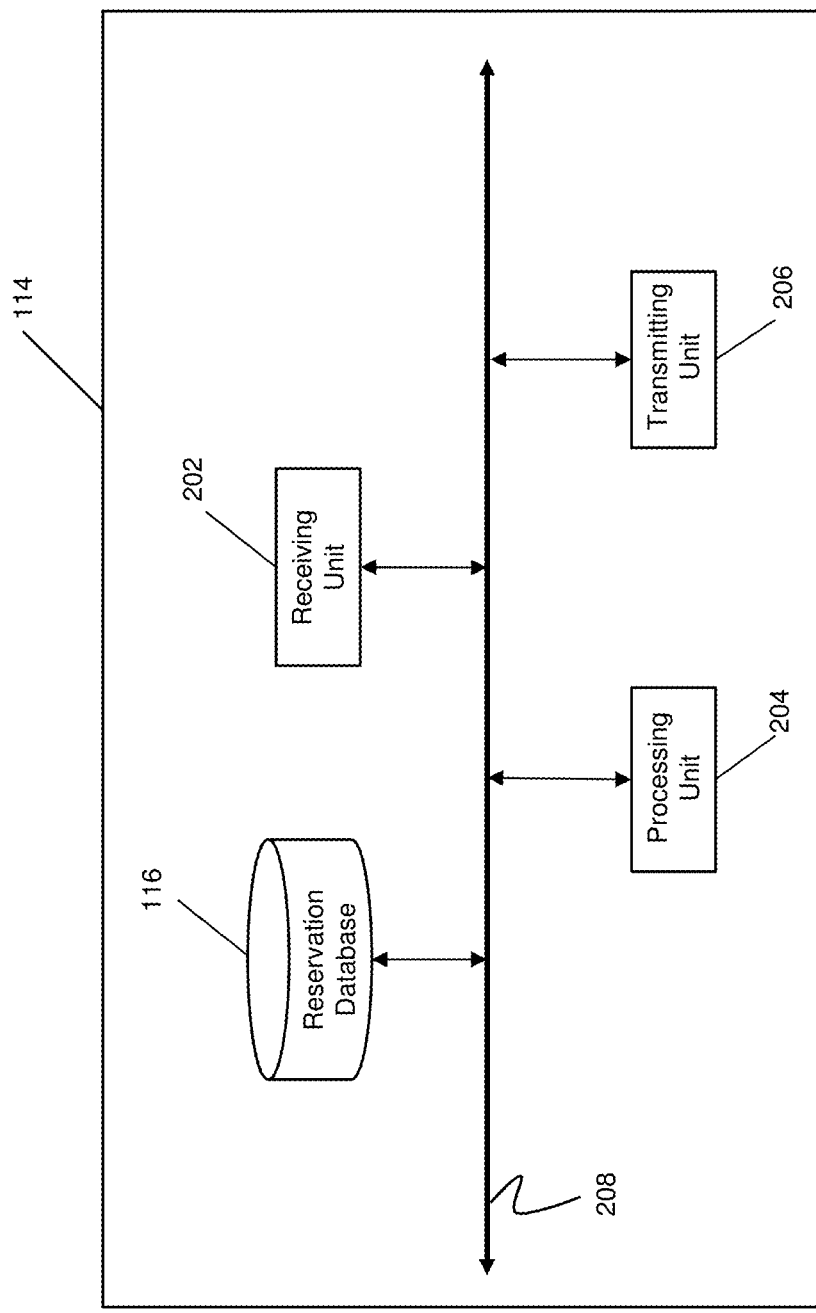
FIG. 2 is a block diagram illustrating a reservation server in accordance with exemplary embodiments.

FIG. 2 illustrates an exemplary reservation server 114 for processing a reservation for a preauthorized transaction. The reservation server 114 may include the reservation database 116, a receiving unit 202, a processing unit 204, and a transmitting unit 206. Each of the components may be connected via a bus 208. Suitable types and configurations of the bus 208 will be apparent to persons having skill in the relevant art.

The receiving unit 202 may be configured to receive reservation information from the consumer device 102. The reservation information may be information for a preauthorized transaction between the third party 108 and the merchant 110 for which the consumer is paying. The reservation information may include a preauthorization amount, payment information, a merchant identifier, and a predetermined period of time during which the reservation must be fulfilled. The processing unit 204 may be configured to store the received reservation information in the reservation database 116. In some embodiments, the reservation information may also include information on the third party 108 (e.g., an identifier, contact information, photograph or description, etc.).

The processing unit 204 may be configured to identify a unique identifier associated with the reservation. The unique identifier may be any value unique to the reservation that may be used for identifying the reservation. The transmitting unit 206 may be configured to transmit the unique identifier to the consumer device 102, for forwarding to the third party 108 for use at the merchant 110. In one embodiment, the transmitting unit 206 may be configured to transmit the unique identifier directly to the third party 108 in place of or in addition to the consumer device 102.

The receiving unit 202 may also be configured to receive from the merchant 110 and/or the third party 108, confirmation of fulfillment of the reservation. In an exemplary embodiment, the receiving unit 202 may receive the confirmation of the fulfillment within the stored predetermined period of time. Methods for fulfilling the reservation by the third party 108 may include the third party 108 providing authenticating information to the merchant 110 (e.g., the unique identifier, name, phone number, etc.) and other methods that will be apparent to persons having skill in the relevant art, such as receiving a transmission from a mobile device associated with the third party 108 (e.g., and configured to identify and transmit a geographic location, read and transmit machine-readable code located at the merchant 110, etc).

The processing unit 204 may be configured to identify the reservation in the reservation database 116 corresponding to the received confirmation. Then, the transmitting unit 206 may be configured to transmit the payment information corresponding to the identified reservation. In one embodiment, the transmitting unit 206 may transmit the payment information to the merchant 110. In another embodiment, the transmitting unit 206 may transmit the payment information to the authorization server 104.

In some embodiments, the receiving unit 202 may be configured to receive a transaction amount for the financial transaction between the third party 108 and the merchant 110. The transmitting unit 206 may be configured to transmit the transaction amount to the consumer device 102 for approval. The receiving unit 202 may be configured to receive the approval, at which time the payment information may be transmitted to the merchant 110 and/or the authorization server 104. In one embodiment, the consumer device 102 may be prompted for approval only if the transaction amount is greater than the preauthorization amount.

The receiving unit 202 may be further configured to receive a notification that the preauthorized transaction has been processed from the authorization server 104. In some embodiments, the notification may be in the form of a receipt. The transmitting unit 206 may be configured to transmit the notification to the consumer device 102. It will be apparent to persons having skill in the relevant art that the reservation server 114 may be configured to perform the same functions as the authorization server 104, discussed in more detail below. In some embodiments, the reservation server 114 and the authorization server 104 may be a single server.

Authorization Server

Figure 3:
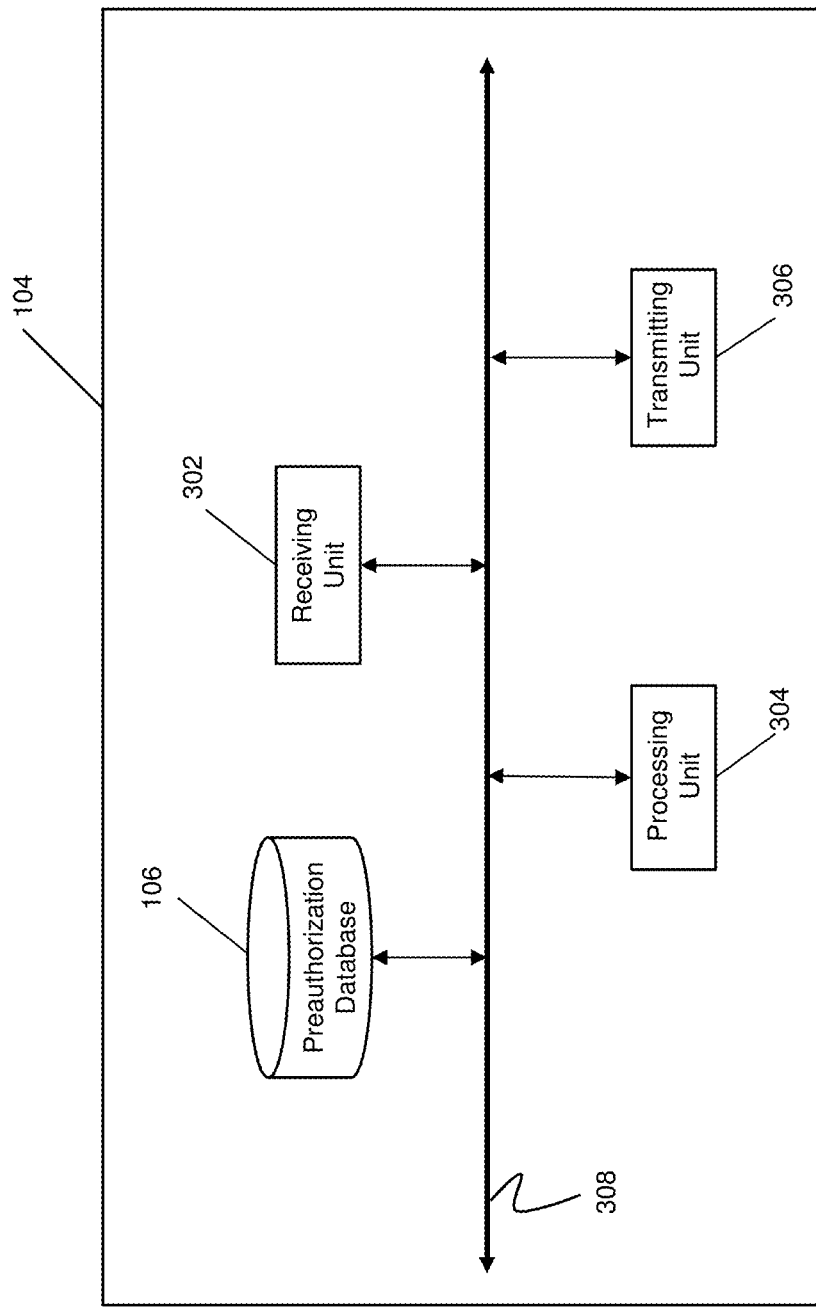
FIG. 3 is a block diagram illustrating an authorization server in accordance with exemplary embodiments.

FIG. 3 illustrates an exemplary authorization server 104. The authorization server 104 may include the preauthorization database 106, a receiving unit 302, a processing unit 304, and a transmitting unit 306. Each of the components may be connected via a bus 308. Suitable types and configurations of the bus 308 will be apparent to persons having skill in the relevant art.

The receiving unit 302 may be configured to receive preauthorization information for a financial transaction to be processed. The preauthorization information may include at least a preauthorization amount, payment information, and a predetermined period of time. The processing unit 304 may be configured to store the preauthorization information in the preauthorization database 106. In one embodiment, the preauthorization information may further include information on the third party 108 and/or a merchant identifier.

The processing unit 304 may be further configured to identify a unique identifier associated with the stored preauthorization information. In some embodiments, the transmitting unit 306 may be configured to transmit the unique identifier (e.g., to the consumer device 102). The receiving unit 302 may be configured to receive an authorization request for a financial transaction, wherein the authorization request includes at least the identified unique identifier and a transaction amount. The processing unit 304 may be configured to process, using the stored payment information, the financial transaction for the transaction amount using methods that will be apparent to persons having skill in the relevant art. In one embodiment, the processing unit 304 may not process the financial transaction if the transaction amount exceeds the preauthorization amount.

In some embodiments, after receiving the authorization request, the transmitting unit 306 may be configured to transmit the transaction amount to the consumer device 102 for approval. In one embodiment, approval may be sought only if the transaction amount exceeds the preauthorization amount. The receiving unit 302 may receive approval for the transaction from the consumer device 102, at which time the processing unit 304 may process the transaction.

The transmitting unit 306 may be further configured to transmit an authorization response to the merchant 110, which may indicate if the transaction has been approved or denied. In one embodiment, the transmitting unit 306 may be further configured to transmit a notification (e.g., or a receipt) to the reservation server 114 and/or the consumer device 102 of the processing of the financial transaction. In a further embodiment, the notification may include the transaction amount.

In some embodiments, the receiving unit 302 may be configured to receive an authorization request that includes the unique identifier and no payment information. In a further embodiment, the processing unit 304 may be configured to identify the preauthorized transaction in the preauthorization database 106. The processing unit 304 may process the financial transaction using the payment information in the corresponding preauthorized transaction. In an alternative further embodiment, the transmitting unit 306 may transmit a request for payment information to the reservation server 114, where the request for payment information may include at least the unique identifier. The receiving unit 302 may receive the payment information from the reservation server 114 as per the request, which the processing unit 304 may use to process the financial transaction.

It will be apparent to persons having skill in the relevant art that the authorization server 104 may be configured to perform the same functions as the reservation server 114 as discussed herein. In some embodiments, the reservation server 114 and the authorization server 104 may be a single server.

Preauthorized Transaction Dataset

Figure 4:
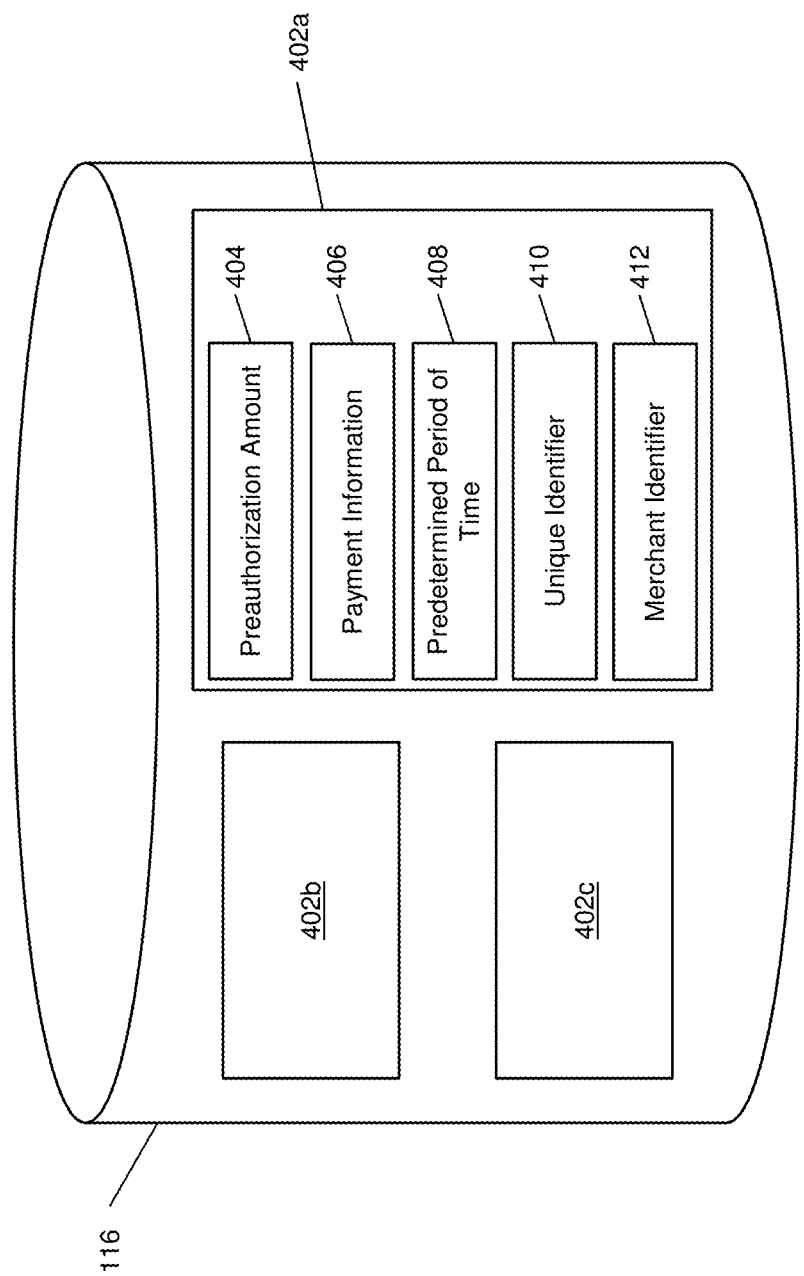
FIG. 4 is a block diagram illustrating a preauthorized transaction dataset in accordance with exemplary embodiments.

FIG. 4 illustrates the reservation database 116 (e.g., or the preauthorization database 106) which may store a plurality of preauthorized transaction datasets 402, 402b, and 402c. Each of the preauthorized transaction datasets 402 may include reservation or preauthorization information for a preauthorized transaction. The preauthorized transaction dataset 402 may include a preauthorization amount 404, payment information 406, a predetermined period of time 408, a unique identifier 410, and a merchant identifier 412. In some embodiments, the preauthorized transaction dataset 402 may also include a consumer identifier and/or a third party identifier.

The preauthorization amount 404 may be a limit (e.g., an upper limit) on the amount for which the preauthorized transaction may be processed. In some embodiments, if the transaction amount for the financial transaction exceeds the preauthorization amount 404, then the financial transaction may be denied. In other embodiments, additional approval for the transaction may be sought by the consumer (e.g., of the consumer device 102) that made the reservation and provided the payment information.

The payment information 406 may include any type of information suitable for use as payment for a financial transaction. For example, the payment information may be a payment card number (e.g., for a card associated with the consumer of the consumer device 102), a financial account number, a gift card number, etc. The predetermined period of time 408 may be a period of time during which the third party 108 may redeem the gift and engage in the financial transaction with the merchant 110. The period of time may be a range (e.g., from July 1 to July 31) or a single limit (e.g., before July 31) of dates and/or times (e.g., between 3:00 p.m. and 11:00 p.m. on July 4). In some embodiments, a hold may be placed on an account corresponding to the payment information 406 during the predetermined period of time 408 for the preauthorization amount 404.

The unique identifier 410 may be any value or type of identifier that is unique to the preauthorized transaction dataset 402 as will be apparent to persons having skill in the relevant art. For example, the unique identifier 410 may be a randomly generated and/or randomly identified number, a random sequence of letters, a combination of letters and numbers, etc. The merchant identifier 412 may be a value associated with the merchant 110. The merchant identifier 412 may be unique to the merchant 110 or may be unique to a specific location of the merchant 110. In one embodiment, the merchant identifier 412 may be a merchant identification number (MID).

The preauthorized transaction dataset 402 may also include a consumer identifier. The consumer identifier may be a unique value associated with a consumer (e.g., an identification number) or the consumer device 102 (e.g., a media access control number). The consumer identifier may be used to transmit information to the consumer, such as requests for approval of a transaction over the preauthorization amount or a receipt for a processed transaction. The preauthorized transaction dataset 402 may also include a third party identifier. The third party identifier may be a value associated with the party 108. The third party identifier may be used to authenticate the third party 108 (e.g., for fulfilling the reservation) and/or may be used to transmit the unique identifier 410 or other information to the third party 108 for use in fulfilling the reservation. Types of information suitable for use as the third party identifier will be apparent to persons having skill in the relevant art and may include name, e-mail address, phone number, etc.

Figure 5:
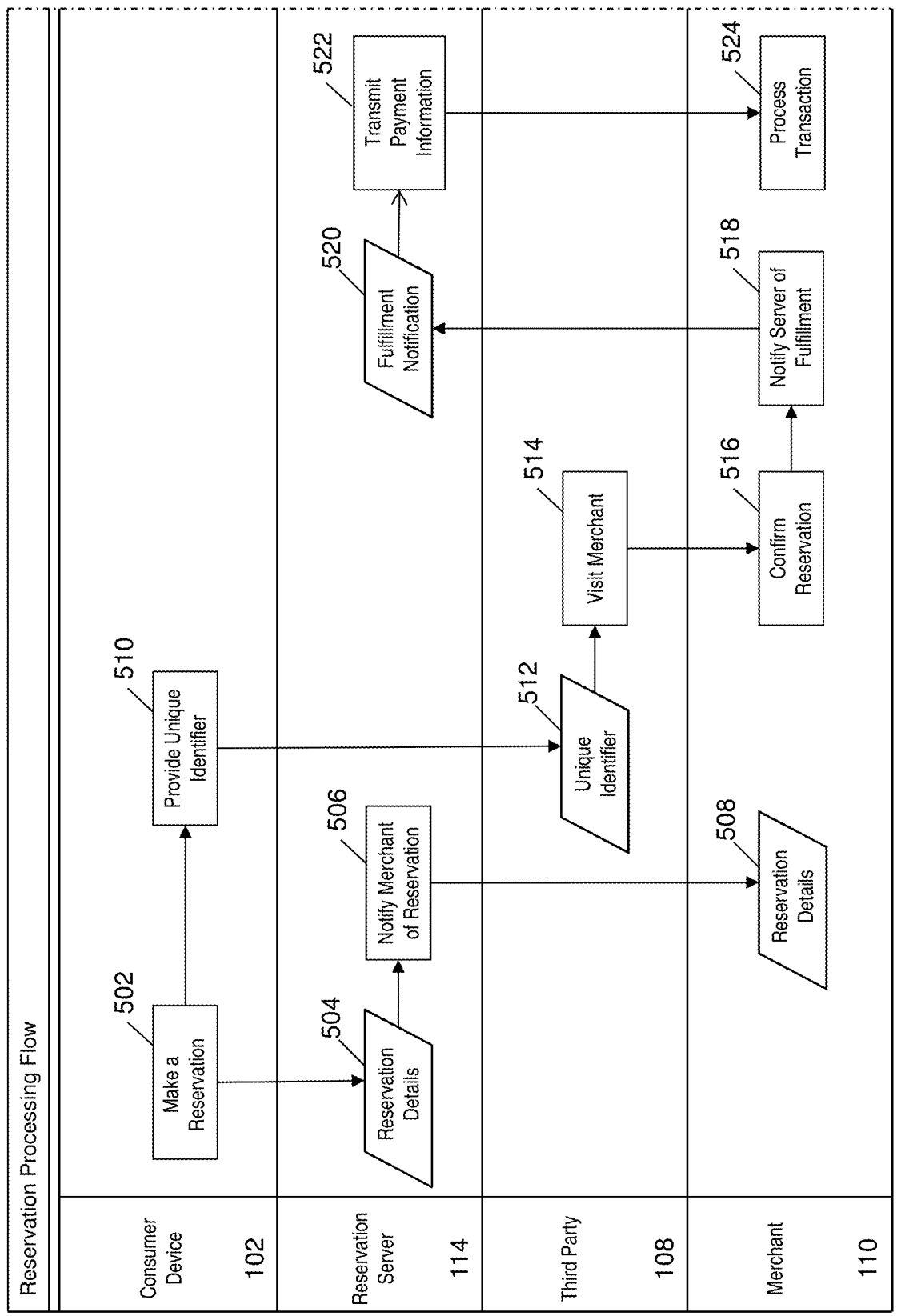
FIG. 5 is a processing flow illustrating a method for preauthorization a financial transaction for a third party in accordance with exemplary embodiments.

Method for Processing Preauthorization for a Transaction Benefiting a Third Party FIG. 5 illustrates a method for processing a reservation, wherein the reservation is preauthorization including payment information for a transaction including a third party.

In step 502, the consumer may make a reservation for a future transaction between the merchant 110 and the third party 108. The consumer may make the reservation by submitting reservation information to the reservation server 114 via the consumer device 102. The reservation information may include at least the preauthorization amount 404, the payment information 406, the merchant identifier 412, and a predetermined period of time 408. The reservation server 114 may identify a unique identifier 410 to be associated with the reservation, which is provided to the consumer device 102 as part of the process of making the reservation. In step 504, the reservation server 114 may store the received information in the reservation database 116.

In step 506, the reservation server 114 may notify the merchant 110 of the reservation by transmitting reservation details to the merchant 110. The reservation details may include at least the predetermined period of time 408 and the unique identifier 410. The merchant 110 may receive the reservation details in step 508. In step 510, the consumer device 102 may provide the unique identifier 410 corresponding to the reservation to the third party 108. In some embodiments, the reservation server 114 may provide the unique identifier 410 to the third party 108 (e.g., using information provided in the reservation information, such as an e-mail address). In one embodiment, the unique identifier 410 may be a number that is provided to the third party 108 for providing to the merchant 110. In a further embodiment, the number may be encoded in a machine readable code which the third party 108 may present (e.g., using a mobile device, such as a smart phone) to the merchant 110 which may be read to obtain the encoded unique identifier 410 to confirm the reservation. In an even further embodiment, the machine readable code may be a bar code, such as a QR code.

In step 512, the third party 108 may receive the unique identifier 410. In step 514, the third party 108 may visit the merchant 110. It will be apparent to persons having skill in the relevant art that the visit may be made in-person (e.g., at a physical location of the merchant 110) or remotely (e.g., at a website operated by or on behalf of the merchant 110). In step 516, the merchant 110 may confirm the reservation. Confirmation of the reservation may include authenticating the third party 108 as the recipient of the preauthorized goods and/or services. Methods of authenticating the third party 108 will be apparent to persons having skill in the relevant art, such as confirming information included in the reservation information (e.g., name, phone number, the unique identifier 410), reading a machine readable code (e.g., a QR code) displayed by the third party 108 (e.g., using a mobile device, such as a smart phone), etc.

In step 518, the merchant 110 may transmit a notification of fulfillment of the reservation to the reservation server 114. The notification may include at least the unique identifier 410 or other information to identify the corresponding preauthorized transaction dataset 402 for the reservation that has been fulfilled. In some embodiments, step 518 may be performed by the third party 108. For example, the third party 108 may use a mobile device (e.g., associated with the third party by the reservation server 114, such as in the preauthorized transaction dataset 402) to notify the reservation server 114 that the reservation is being fulfilled. Methods for notifying the reservation server 114 may include reading a machine readable code displayed at the merchant 110 encoded with information (e.g., a geographic location, unique value, etc.) to be transmitted to the reservation server 114, identifying a geographic location of the mobile device to be a geographic location associated with the merchant 110, etc.

In step 520, the reservation server 114 may receive the notification of fulfillment and then, in step 522, may transmit the payment information 406 to the merchant 110. The merchant 110 may use the payment information 406 to, in step 524, process a financial transaction using the payment information 406 originally supplied by the consumer. In one embodiment, the reservation server 114 may transmit the payment information 406 directly to the authorization server 104 that is processing the financial transaction. In a further embodiment, the payment information 406 may be transmitted in response to a request by the authorization server 104 or the merchant 110.

In such a method, a consumer is able to gift the third party 108 for a future transaction without the risk that the consumer or third party 108 will lose value in the transaction. The third party 108 transacts with the merchant 110, but the payment information 406 of the consumer is used and therefore pays for the transaction as to the precise amount without the need for the third party 108 to pay an additional amount or for the consumer to pay for value that is not used.

Method for Processing a Preauthorized Transaction Benefiting a Third Party

Figure 6A:
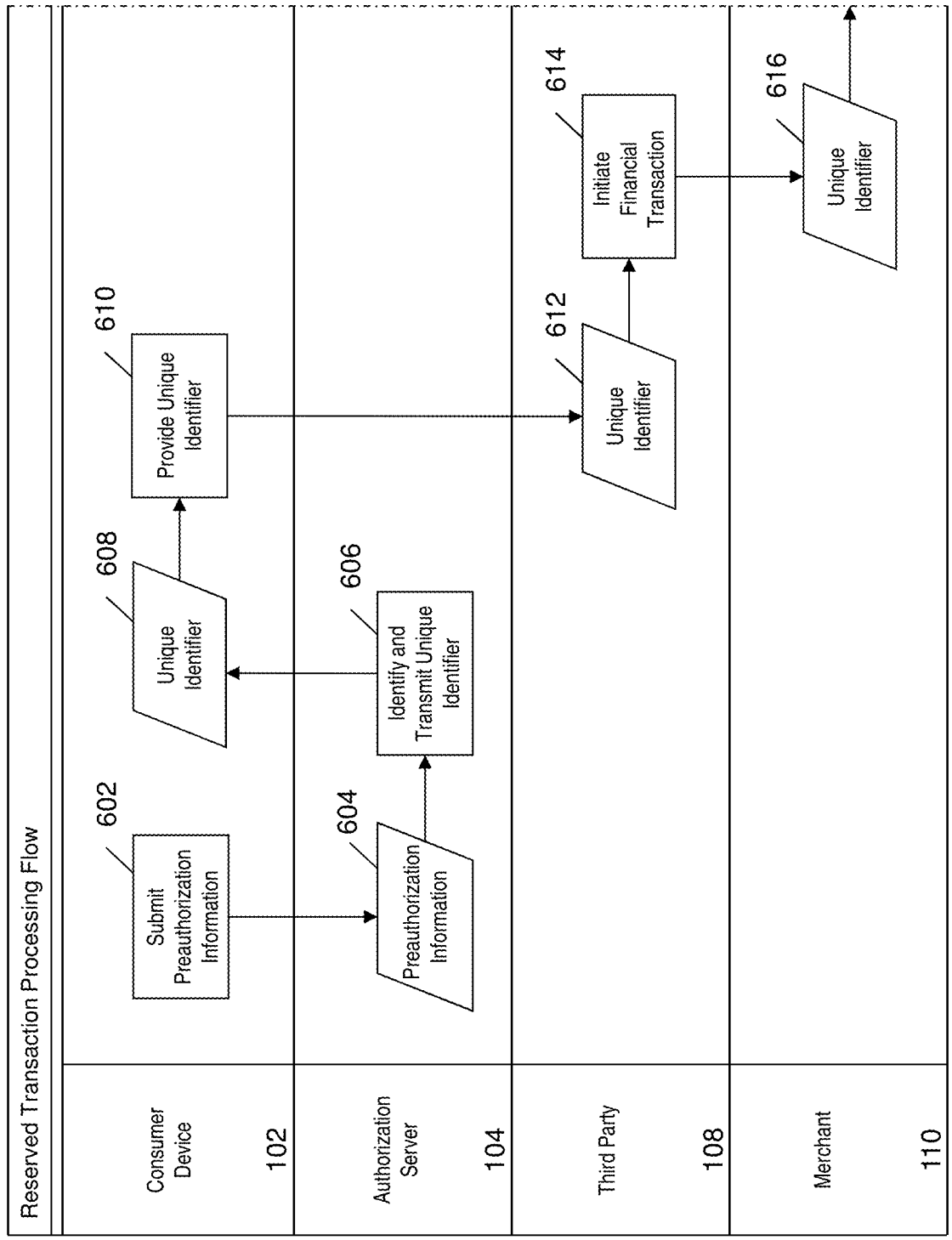
FIGS. 6A and 6B are a flow diagram illustrating a method for processing a preauthorized transaction initiated by a third party in accordance with exemplary embodiments.
Figure 6B:
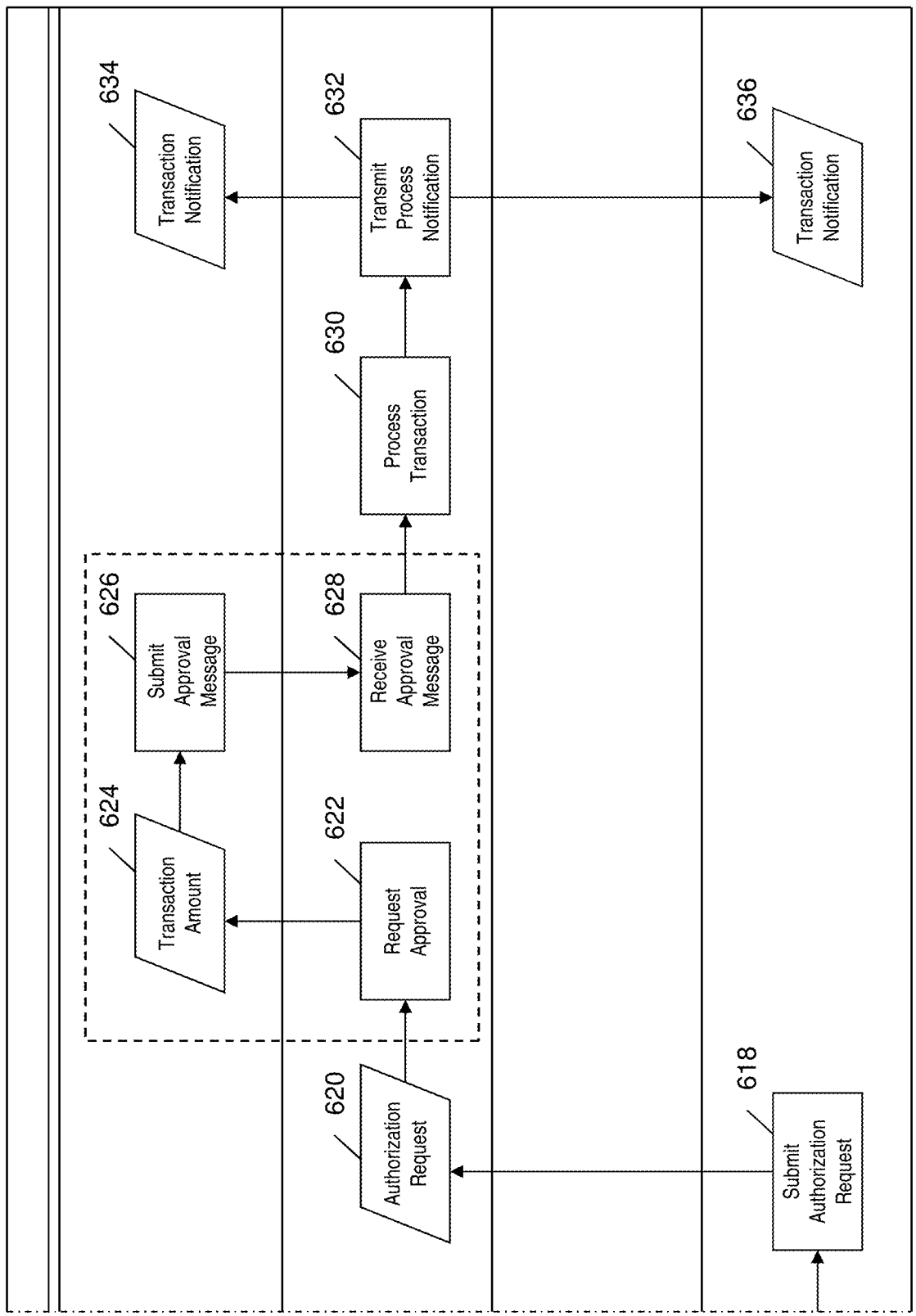

FIGS. 6A and 6B are a flow diagram illustrating a method for processing a financial transaction including a third party that is preauthorized with payment information from a consumer.

In step 602, the consumer (e.g., via the consumer device 102) may submit preauthorization information for the future transaction to the authorization server 104. The preauthorization information may include at least the preauthorization amount 404, the payment information 406, and the predetermined period of time 408. In step 604, the authorization server 104 may receive and store, in the preauthorization database 106, the preauthorization information. In step 606, the authorization server 104 may identify a unique identifier (e.g., the unique identifier 410) associated with the preauthorized transaction and may transmit the unique identifier 410 to the consumer device 102. In one embodiment, the unique identifier 410 may be encoded in a machine readable code, which may be transmitted to the consumer device 102. In a further embodiment, the machine readable code may be a bar code, such as a QR code.

In step 608, the consumer device 102 may receive the unique identifier 410, which may be provided to the third party 108 in step 610. In one embodiment, the consumer device 102 may transmit the unique identifier 410 electronically (e.g., by e-mail, short message service (SMS) message, etc.) to a mobile device of the third party 108. It will be apparent to persons having skill in the relevant art that step 610 may be performed by the authorization server 104, which may transmit the unique identifier 410 to the third party 108 directly instead of/in addition to the consumer device 102. In step 612, the third party 108 may receive the unique identifier 410.

In step 614, the third party 108 may initiate a financial transaction with the merchant 110 and provide the merchant 110 with the unique identifier 410. In one embodiment, the third party 108 may provide the unique identifier 410 by displaying (e.g., on paper, a mobile device, etc.) a machine readable code (e.g., a QR code) encoded with the unique identifier, which may be read by a point-of-sale at the merchant 110. In another embodiment, the third party 108 may transmit the unique identifier 410 to a point-of-sale of the merchant 110 through near field communication (NFC). Additional methods for providing the unique identifier 410 at the point-of-sale will be apparent to persons having skill in the relevant art.

In step 616, the merchant 110 may receive the unique identifier 410 and then, in step 618, may submit an authorization request to the authorization server 104. The authorization server 104 may receive the authorization request in step 620, and the authorization request may include at least a transaction amount and the unique identifier 410.

In step 622, the authorization server 104 may submit a request for approval to the consumer device 102 in order to approve the transaction. In one embodiment, the request for approval may only be submitted if the transaction amount exceeds the preauthorization amount 404. In step 624, the consumer device 102 may receive the transaction amount as part of the request for approval, which may be displayed to the consumer on a display of the consumer device 102. The consumer may approve the amount and, in step 626, submit an approval message to the authorization server 104. The authorization server 104 may then receive the approval message in step 628. It will be apparent to persons having skill in the relevant art that steps 622 to 628 may be optional steps. For example, the authorization server 104 may not be required to seek approval of the transaction by the consumer and may process the transaction as soon as the authorization request is received (e.g., if the transaction amount if within the preauthorized amount 404).

In step 630, the authorization server 104 may process the financial transaction using the payment information 406 in the preauthorized transaction dataset 402 corresponding to the unique identifier 410 included in the authorization request. Methods suitable for processing the financial transaction will be apparent to persons having skill in the relevant art, such as the traditional four party transaction processing method. As part of the process, the authorization server 104 may approve or deny or splitting the financial transaction (e.g., based on the adequacy and/or validity of the payment information 406). In step 632, the authorization server 104 may transmit notification of the processing (e.g., the approval or denial) to the merchant 110 and the consumer device 102.

In step 634, the consumer device 102 may receive the transaction notification, which may be displayed to the consumer via a display the consumer device 102. In some embodiments, the notification may be in the form of a receipt. In one embodiment, the notification may be received by the consumer device 102 by at least one of e-mail, SMS message, or via an application program executed by a processor on the consumer device 102. In step 636, the merchant 110 may receive the transaction notification and then finalize the transaction with the third party 108 (e.g., by providing the transacted goods and/or services, furnishing a receipt, etc.).

Computer System Architecture

Figure 7:
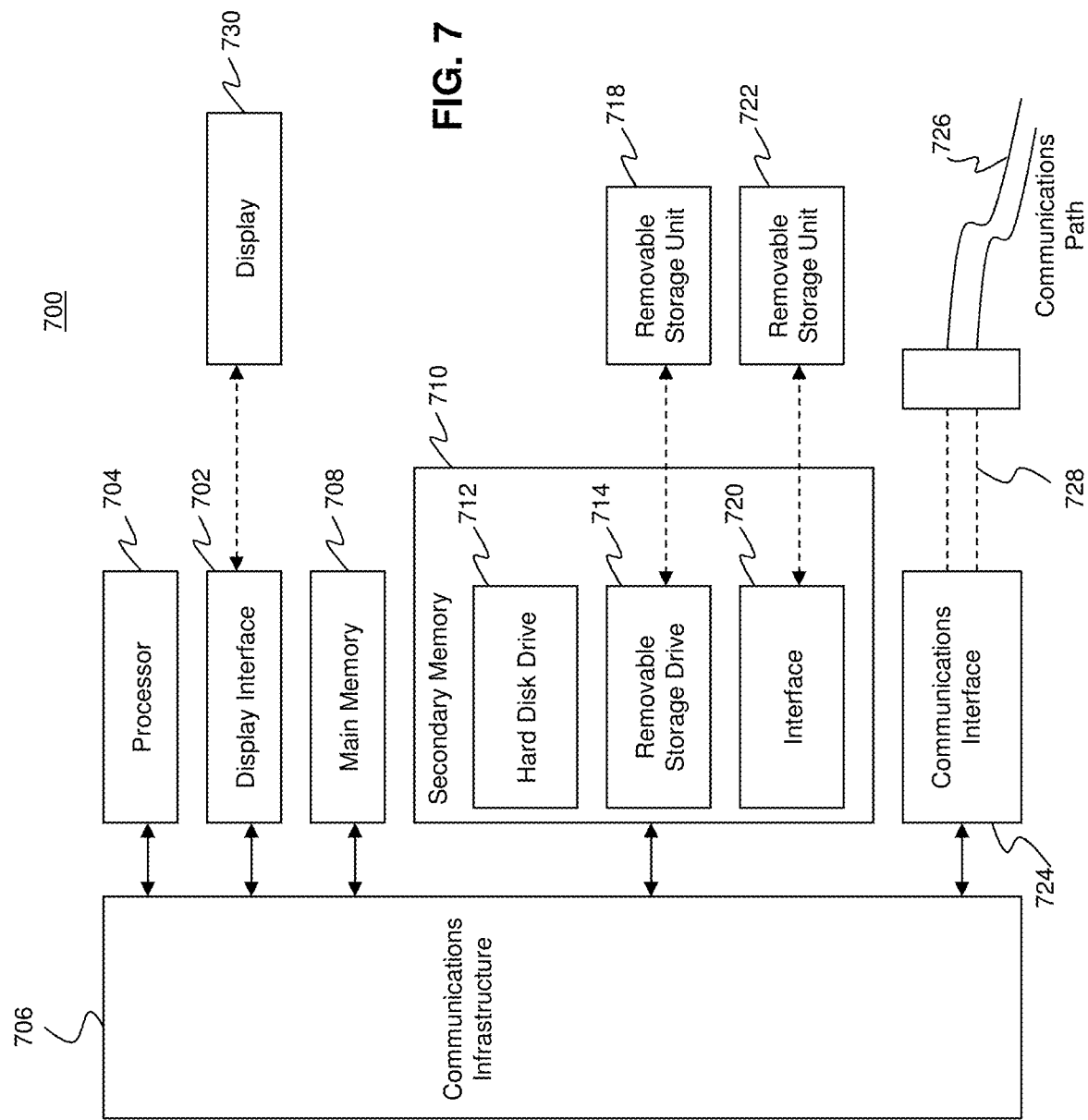
FIG. 7 is a block diagram illustrating system architecture of a computer system in accordance with exemplary embodiments.

FIG. 7 illustrates a computer system 700 in which embodiments of the present disclosure, or portions thereof, may be implemented as computer-readable code. For example, the consumer device 102, the authorization server 104, the merchant 110, and the reservation server 114 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5, 6A, 6B, 8, and 9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores."

The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 704 may be a special purpose or a general purpose processor device. The processor device 704 may be connected to a communication infrastructure 706, such as a bus, message queue, network (e.g., the network 108), multi-core message-passing scheme, etc. The computer system 800 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive, the removable storage unit 718 may be a floppy disk. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

Computer program medium and computer usable medium may refer to memories, such as the main memory 708 and secondary memory 710, which may be memory semiconductors (e.g. DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 5, 6A, 6B, 8, and 9, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Exemplary Method for Processing a Reservation

Figure 8:
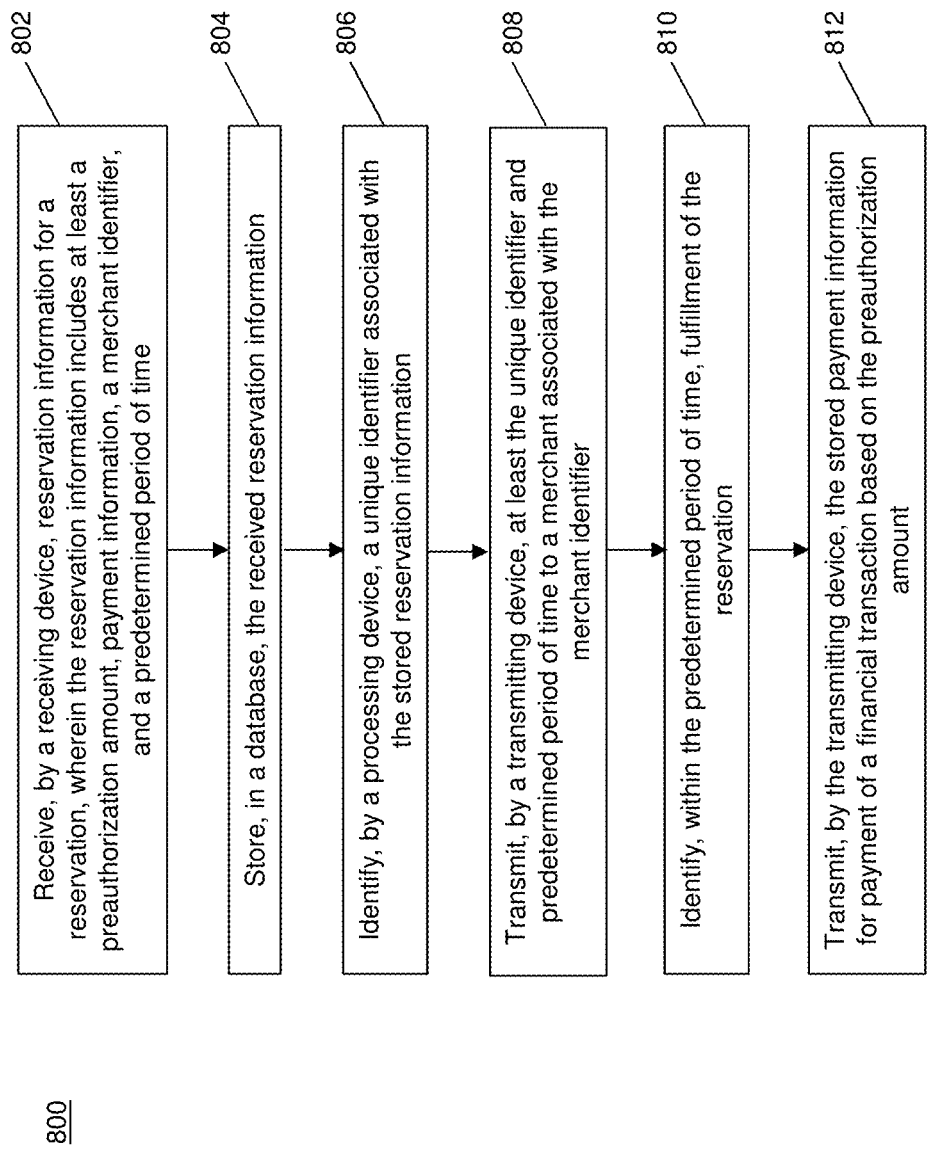
FIG. 8 is a flow chart illustrating a method for processing a reservation for a preauthorized transaction to benefit a third party in accordance with exemplary embodiments.

FIG. 8 illustrates a method 800 for processing a reservation including payment information for a preauthorized transaction benefiting a third party.

In step 802, reservation information for a reservation may be received by a receiving device (e.g., the receiving unit 202), wherein the reservation information includes at least a preauthorization amount (e.g., the preauthorization amount 404), payment information (e.g., the payment information 406), a merchant identifier (e.g., the merchant identifier 402), and a predetermined period of time (e.g., the predetermined period of time 408). In one embodiment, the payment information 406 may include a payment card associated with a consumer. In step 804, the received reservation information may be stored in a database (e.g., the reservation database 116).

In step 806, a unique identifier (e.g., the unique identifier 410) associated with the stored reservation information may be identified by a processing device (e.g., the processing unit 204). In step 808, at least the unique identifier 410 and the predetermined period of time 408 may be transmitted, by a transmitting device (e.g., the transmitting unit 206) to a merchant (e.g., the merchant 110) associated with the merchant identifier 412. In an exemplary embodiment, the payment information 406 is not transmitted to the merchant 110.

In step 810, fulfillment of the reservation may be identified within the predetermined period of time 408. In one embodiment, identifying fulfillment of the reservation may include receiving, by the receiving unit 202, an indication of confirmation of the reservation from the merchant 110. In a further embodiment, the indication of confirmation may include at least the unique identifier 410. In an alternative further embodiment, the indication of confirmation may further include a transaction amount. In an even further embodiment, the transaction amount may be less than or equal to the preauthorization amount 404.

In step 812, the stored payment information may be transmitted, by the transmitting unit 206, for payment of a financial transaction based on the preauthorization amount 404. In some embodiments, the method 800 may further include: receiving, by the receiving unit 202, a transaction amount for the financial transaction; transmitting, by the transmitting unit 206, the transaction amount to a mobile communication device (e.g., the consumer device 102); and receiving, from the consumer device 102, an approval message approving the transaction amount, wherein the approval message is received from the consumer device 102 before transmitting the stored payment information 406.

Exemplary Method for Processing a Financial Transaction

FIG. 9 illustrates a method 900 for processing a financial transaction preauthorized with payment information to benefit a third party.

In step 902, preauthorization information for a financial transaction to be processed is received by a receiving device (e.g., the receiving unit 302), wherein the preauthorization information includes at least a preauthorization amount (e.g., the preauthorization amount 404), payment information (e.g., the payment information 406), and a predetermined period of time (e.g., the predetermined period of time 408). In one embodiment, the payment information 406 may include a payment card associated with a consumer. In another embodiment, the payment information 406 may include a financial account, wherein a hold is placed on the financial account for at least the preauthorization amount 404 for the predetermined period of time 408. In some embodiments, the preauthorization information may further include a merchant identifier (e.g., the merchant identifier 412).

In step 904, the preauthorization information may be stored in a database (e.g., the preauthorization database 106). In step 906, a unique identifier (e.g., the unique identifier 410) associated with the stored preauthorization information may be identified by a processing device (e.g., the processing unit 304). In one embodiment, the unique identifier 410 may be included in the preauthorization information.

In step 908, an authorization request for the financial transaction may be received within the predetermined period of time 408, wherein the authorization request includes at least the unique identifier 410 and a transaction amount. In one embodiment, the transaction amount may be less than or equal to the preauthorization amount 304. In embodiments where the preauthorization information includes the merchant identifier 412, the authorization request may further include the merchant identifier 412.

In step 910, the financial transaction may be processed, by the processing unit 304, using the stored payment information 406 based on a comparison of the preauthorization amount 404 and the transaction amount. In one embodiment, step 910 may include approving the financial transaction if the transaction amount is less than or equal to the preauthorization amount 404. In another embodiment, step 910 may include denying or splitting the financial transaction if the transaction amount is greater than the preauthorization amount 404. In an exemplary embodiment, the payment information 406 is never provided to a server provider (e.g., the merchant 110).

In some embodiments, the method 900 may further include transmitting, by a transmitting device (e.g., the transmitting unit 306), the transaction amount to a mobile communication device (e.g., the consumer device 102), and receiving, by the receiving unit 302, an approval message approving the transaction amount, wherein the processing step further includes processing the financial transaction after receiving the approval message.

Techniques consistent with the present disclosure provide, among other features, systems and methods for facilitating the receipt of goods and/or services by a third party. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of processing a reservation, comprising:
   receiving, by a receiving device of a reservation server, reservation information for a reservation from a consumer, wherein the reservation information includes at least a preauthorization amount, payment information, a merchant identifier, and a predetermined period of time, wherein said preauthorization amount (i) represents an upper limit on an amount for which a transaction associated with the reservation may be processed and (ii) is not required to be known by a third party, said third party being different from the consumer;
   storing, in a database device of the reservation server, the received reservation information;
   identifying, by a processing device of the reservation server, a unique identifier associated with the stored reservation information;
   prior to (i) the third party visiting a merchant associated with the merchant identifier of the stored reservation information and (ii) initiation of a transaction associated with the reservation, transmitting, by a transmitting device of the reservation server, at least the unique identifier associated with the stored reservation information and predetermined period of time to the merchant associated with the merchant identifier;
   once the third party visits the merchant and fulfills the reservation within the predetermined period of time, receiving, by the receiving device of the reservation server, from the merchant, data identifying, within the predetermined period of time, fulfillment of the reservation, said data identifying fulfillment of the reservation includes a transaction amount for a financial transaction associated with fulfillment of the reservation; and
   transmitting, by the transmitting device of the reservation server, the stored payment information for payment of the financial transaction, associated with fulfillment of the reservation, based on the preauthorization amount.

2. The method of claim 1, further comprising:
   transmitting, by the transmitting device of the reservation server, the transaction amount to a mobile communication device of the consumer; and
   receiving, from the mobile communication device, an approval message approving the transaction amount, wherein the approval message is received from the mobile communication device before transmitting the stored payment information.

3. The method of claim 1 wherein the payment information includes a payment card associated with the consumer.

4. The method of claim 1, wherein the stored payment information is not transmitted to the merchant.

5. The method of claim 1, wherein identifying fulfillment of the reservation includes receiving, by the receiving device of the reservation server, an indication of confirmation of the reservation from the merchant.

6. The method of claim 5, wherein the indication of confirmation includes at least the unique identifier.

7. The method of claim 5, wherein the indication of confirmation further includes a transaction amount.

8. The method of claim 7, wherein the preauthorization amount is selected to be greater than or equal to a predicted transaction amount.

9. A method of processing a financial transaction, comprising:

receiving, by a receiving device of a server, preauthorization information from a consumer, wherein the preauthorization information includes at least a preauthorization amount, payment information, and a predetermined period of time, wherein said preauthorization amount (i) represents an upper limit on an amount for which a financial transaction may be processed and (ii) is not required to be known by a third party, said third party being different from the consumer;

storing, in a database device of the server, the received preauthorization information;

identifying, by a processing device of the server, a unique identifier associated with the stored preauthorization information;

prior to the third party visiting a merchant and prior to an initiation of the financial transaction, transmitting, by a transmitting device of the server, at least the unique identifier and the predetermined period of time to the merchant;

once the third party initiates the financial transaction with the merchant within the predetermined period of time, receiving, by the receiving device of the server, within the predetermined period of time, an authorization request from the merchant for the financial transaction, wherein the authorization request includes at least the unique identifier associated with the stored preauthorization information and a transaction amount; and processing, by the processing device of the server, the financial transaction using the stored payment information based on a comparison of the preauthorization amount and the transaction amount.

10. The method of claim 9, further comprising:

transmitting, by a transmitting device of the server, the transaction amount to a mobile communication device of the consumer; and receiving, by the receiving device of the server, an approval message approving the transaction amount, wherein the processing step further includes processing the financial transaction after receiving the approval message.

11. The method of claim 9, wherein the transaction amount is less than or equal to the preauthorization amount.

12. The method of claim 9, wherein the payment information includes a payment card associated with the consumer.

13. The method of claim 9, wherein the preauthorization information further includes a merchant identifier associated with the merchant, and the authorization request further includes the merchant identifier.

14. The method of claim 9, wherein the preauthorization information further includes the unique identifier.

15. The method of claim 9, wherein the processing step includes approving the financial transaction if the transaction amount is less than or equal to the preauthorization amount.

16. The method of claim 9, wherein the processing step includes denying or splitting the financial transaction if the transaction amount is greater than the preauthorization amount.

17. The method of claim 9, wherein the payment information is not provided to the merchant.

18. The method of claim 9, wherein the payment information includes a financial account and wherein a hold is placed on the financial account for at least the preauthorization amount for the predetermined period of time.

19. A system processing a reservation, comprising:

a receiver configured to receive reservation information for a reservation from a consumer, wherein the reservation information includes at least a preauthorization amount, payment information, a merchant identifier, and a predetermined period of time, wherein said preauthorization amount (i) represents an upper limit on an amount for which a transaction associated with the reservation may be processed and (ii) is not required to be known by a third party, said third party being different from the consumer;

a database device configured to store the received reservation information;

a processor configured to identify a unique identifier associated with the stored reservation information; and a transmitter configured to transmit, prior to (i) the third party visiting a merchant associated with the merchant identifier of the stored reservation information and (ii) an initiation of a transaction associated with the reservation, at least the unique identifier associated with the stored reservation information and predetermined period of time to the merchant associated with the merchant identifier, wherein the receiver is further configured to receive from the merchant, once the third party visits the merchant and fulfills the reservation within the predetermined period of time, data identifying fulfillment of the reservation, said data identifying fulfillment of the reservation including a transaction amount for a financial transaction associated with fulfillment of the reservation, and the transmitter is further configured to transmit the stored payment information for payment of the financial transaction, associated with the fulfillment of the reservation, based on the preauthorization amount.

20. The system of claim 19, wherein the transmitter is configured to transmit the transaction amount to a mobile communication device of the consumer, and the receiver is further configured to receive, from the mobile communication device, an approval message approving the transaction amount, wherein the approval message is received from the mobile communication device before transmitting the stored payment information.

21. The system of claim 19 wherein the payment information includes a payment card associated with the consumer.

22. The system of claim 19, wherein the stored payment information is not transmitted to the merchant.

23. The system of claim 19, wherein the receiver is further configured to receive an indication of confirmation of the reservation from the merchant.

24. The system of claim 23, wherein the indication of confirmation includes at least the unique identifier.

25. The system of claim 23, wherein the indication of confirmation further includes a transaction amount.

26. The system of claim 25, wherein the preauthorization amount is greater than or equal to the predicted transaction amount.

27. A system for processing a financial transaction, comprising:

a processor;

a receiver configured to receive preauthorization information from a consumer, wherein the preauthorization information includes at least a preauthorization amount, payment information, and a predetermined period of time, wherein said preauthorization amount (i) represents an upper limit on an amount for which a financial transaction may be processed and (ii) is not required to be known by a third party, said third party being different from the consumer;

a database device configured to store the received preauthorization information; and a transmitter configured to transmit, prior to the third party visiting a merchant and prior to an initiation of the financial transaction, at least a unique identifier associated with the stored preauthorization information and predetermined period of time to the merchant, wherein the receiver is further configured to receive, once the third party initiates the financial transaction with the merchant within the predetermined period of time, an authorization request from the merchant for the financial transaction, wherein the authorization request includes at least a transaction amount and the unique identifier, and the processor is configured to process the financial transaction using the stored payment information based on a comparison of the preauthorization amount and the transaction amount.

28. The system of claim 27, further comprising:

a transmitter configured to transmit the transaction amount to a mobile communication device of the consumer, wherein the receiver is further configured to receive an approval message approving the transaction amount, and the processor is further configured to process the financial transaction after the receiver having received the approval message.

29. The system of claim 27, wherein the transaction amount is less than or equal to the preauthorization amount.

30. The system of claim 27, wherein the payment information includes a payment card associated with the consumer.

31. The system of claim 27, wherein the preauthorization information further includes a merchant identifier associated with the merchant and the authorization request further includes the merchant identifier.

32. The system of claim 27, wherein the preauthorization information further includes the unique identifier.

33. The system of claim 27, wherein the processor is further configured to approve the financial transaction if the transaction amount is less than or equal to the preauthorization amount.

34. The system of claim 27, wherein the processor is further configured to deny or split the financial transaction if the transaction amount is greater than the preauthorization amount.

35. The system of claim 27, wherein the payment information is not provided to the merchant.

36. The system of claim 27, wherein the payment information includes a financial account and wherein a hold is placed on the financial account for at least the preauthorization amount for the predetermined period of time.

* * * * *